(12) United States Patent
Seo et al.

(10) Patent No.: US 11,207,644 B2
(45) Date of Patent: *Dec. 28, 2021

(54) FILTER MEDIUM WITH IMPROVED BACKWASHING DURABILITY, METHOD FOR MANUFACTURING SAME, AND FILTER UNIT COMPRISING SAME

(71) Applicant: AMOGREENTECH CO., LTD., Gimpo-si (KR)

(72) Inventors: In Yong Seo, Seoul (KR); Ui Young Jeong, Incheon (KR)

(73) Assignee: Amogreentech Co., Ltd., Gimpo-si (KR)

( * ) Notice: Subject to any disclaimer, the term of this patent is extended or adjusted under 35 U.S.C. 154(b) by 14 days.

This patent is subject to a terminal disclaimer.

(21) Appl. No.: 16/469,723

(22) PCT Filed: Dec. 14, 2017

(86) PCT No.: PCT/KR2017/014693
§ 371 (c)(1),
(2) Date: Jun. 14, 2019

(87) PCT Pub. No.: WO2018/110990
PCT Pub. Date: Jun. 21, 2018

(65) Prior Publication Data
US 2020/0078742 A1    Mar. 12, 2020

(30) Foreign Application Priority Data
Dec. 15, 2016    (KR) .................. 10-2016-0171514

(51) Int. Cl.
*B01D 69/10*    (2006.01)
*B01D 39/16*    (2006.01)
(Continued)

(52) U.S. Cl.
CPC ......... *B01D 69/10* (2013.01); *B01D 39/1623* (2013.01); *B01D 63/08* (2013.01);
(Continued)

(58) Field of Classification Search
CPC .... B01D 39/1623; B01D 63/08; B01D 65/02; B01D 65/08; B01D 69/06; B01D 69/10; B01D 71/34
See application file for complete search history.

(56) References Cited

U.S. PATENT DOCUMENTS

| | | | | |
|---|---|---|---|---|
| 5,665,235 A | * | 9/1997 | Gildersleeve | B01D 39/083 210/503 |
| 2010/0096317 A1 | * | 4/2010 | Morita | B01D 71/36 210/321.84 |

(Continued)

FOREIGN PATENT DOCUMENTS

| KR | 20080060263 A | 7/2008 |
|---|---|---|
| KR | 20100028011 A | 3/2010 |

(Continued)

OTHER PUBLICATIONS

Britannica, Calendaring, Oct. 30, 2007, Encyclopaedia Britannica, Inc. (Year: 2007).*

*Primary Examiner* — Hayden Brewster
(74) *Attorney, Agent, or Firm* — Rothwell, Figg, Ernst & Manbeck, P C.

(57) ABSTRACT

A filter medium is provided. The filter medium according to an embodiment of the present invention comprises a second support body and a nanofiber web layer which are sequentially stacked on each of both surfaces of a first support body, and is a filter medium having a flow path through which a filtrate filtrated in the nanofiber web flows in the direction of the first support body, wherein the nanofiber web has a basis weight of 30 g/m2 or less, the first support body has a basis weight of 250 g/m2 or more, and a thickness of 90% or more (Continued)

of the total thickness of the filter media. Accordingly, even in a backwash process performed at high pressure, as the shape, structural deformation, and damage of the filter medium can be minimized, the use period can be extended. In addition, as the flow path is smoothly secured at high pressure applied at the time of filtration and/or backwashing, the filtration water is quickly discharged to the outside from the inside of the filter medium or the backwashing efficiency is very excellent, and accordingly it is possible to be applied in various ways in various water treatment fields.

6 Claims, 6 Drawing Sheets

(51) Int. Cl.
*B01D 63/08* (2006.01)
*B01D 65/02* (2006.01)
*B01D 65/08* (2006.01)
*B01D 69/06* (2006.01)
*B01D 71/34* (2006.01)

(52) U.S. Cl.
CPC ............. *B01D 65/02* (2013.01); *B01D 65/08* (2013.01); *B01D 69/06* (2013.01); *B01D 71/34* (2013.01)

(56) References Cited

U.S. PATENT DOCUMENTS

| | | | |
|---|---|---|---|
| 2013/0256230 A1* | 10/2013 | Dullaert | ................... D01F 6/60 210/650 |
| 2014/0014573 A1 | 1/2014 | Hosoya et al. | |
| 2014/0197095 A1* | 7/2014 | Demmel | ................ B01D 39/18 210/491 |

FOREIGN PATENT DOCUMENTS

| | | |
|---|---|---|
| KR | 20110120202 A | 11/2011 |
| KR | 20150017298 A | 2/2015 |
| KR | 20150040692 A | 4/2015 |
| KR | 20170135768 A | 12/2017 |
| KR | 20180018932 A | 2/2018 |
| KR | 20180018934 A | 2/2018 |

* cited by examiner

【Fig.1】
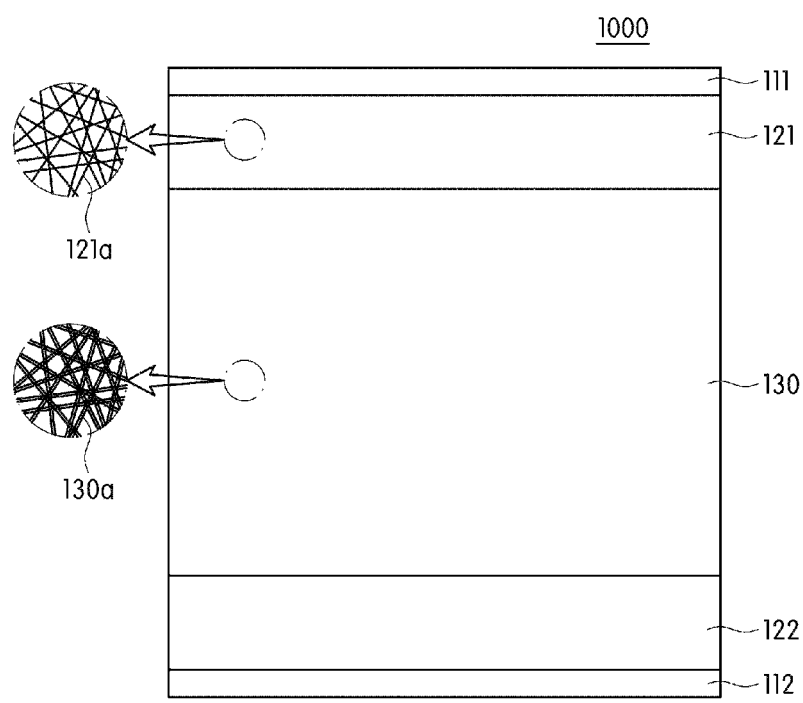
【Fig. 2】
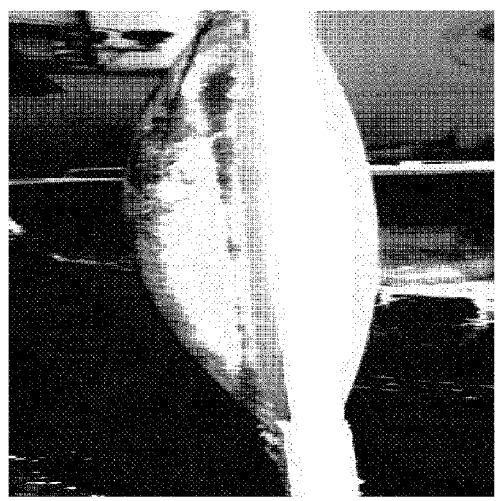

[Fig. 3]
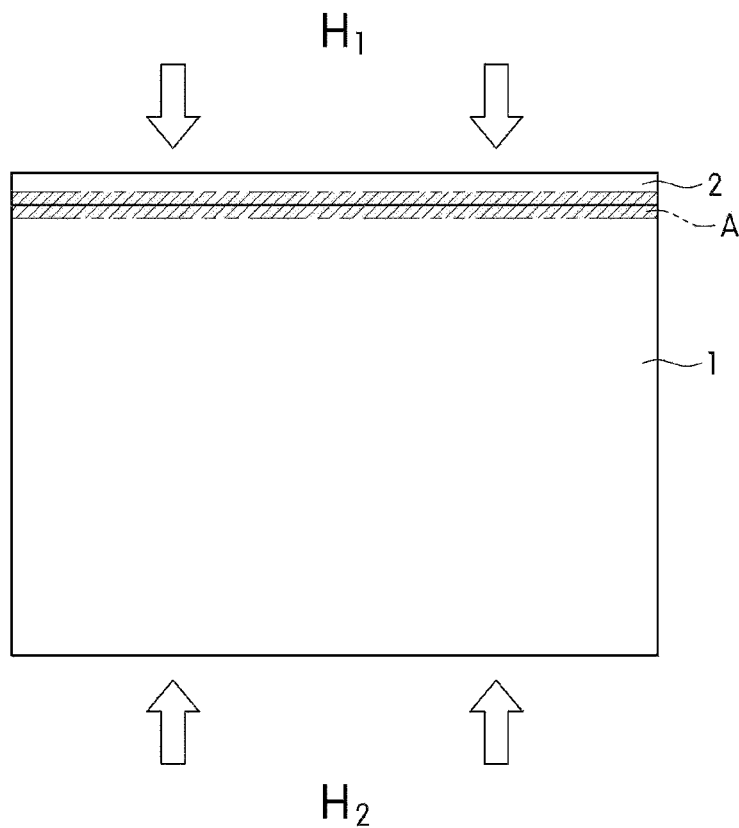
[Fig. 4a]
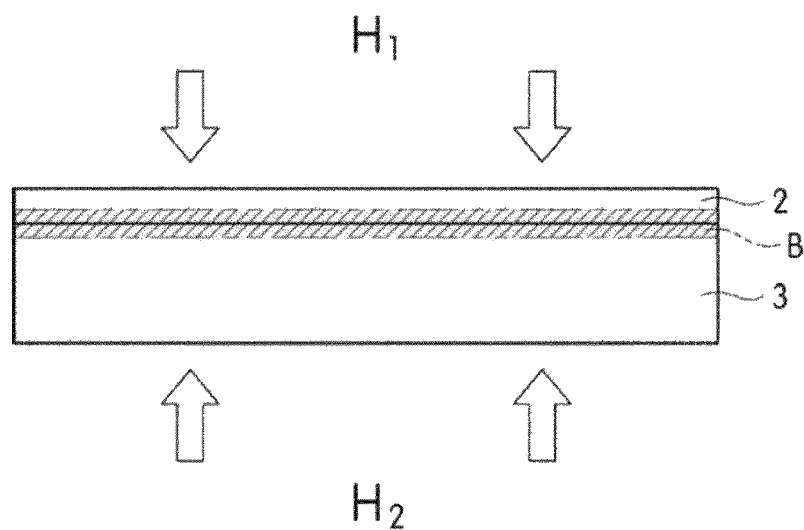

[Fig. 4b]
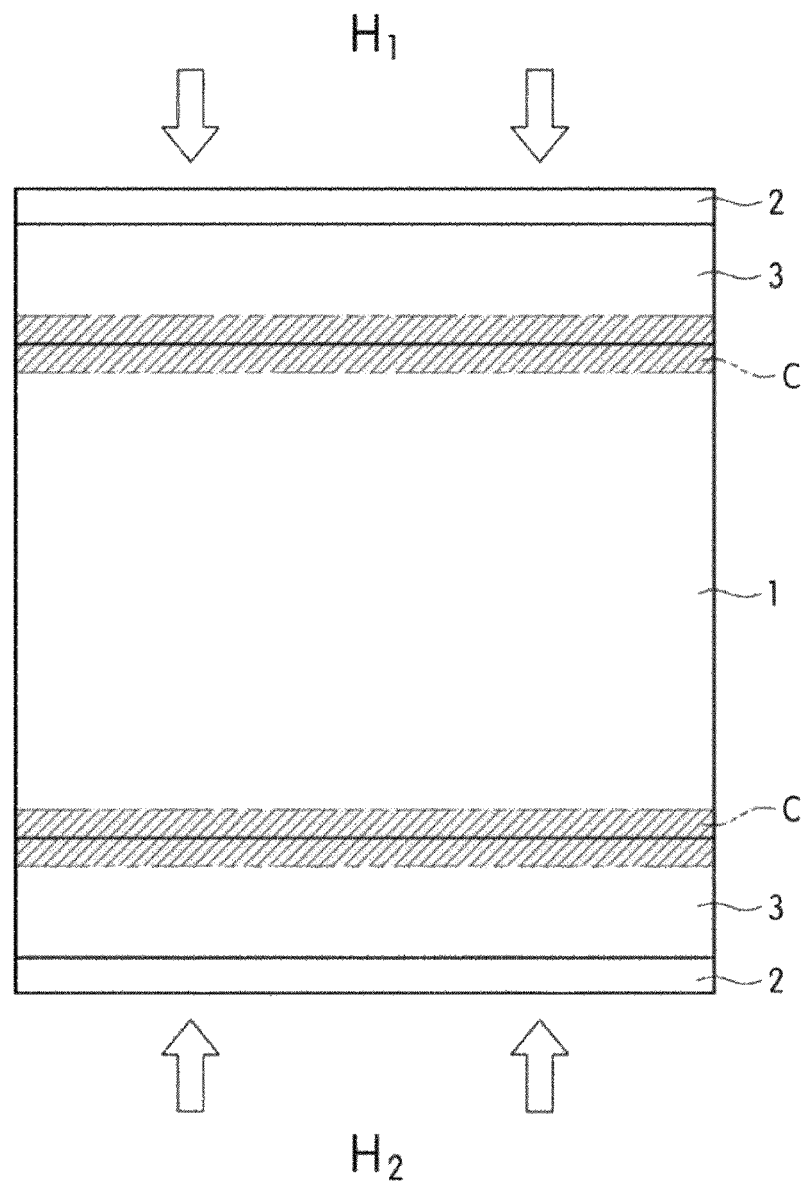

FILTER MEDIUM WITH IMPROVED BACKWASHING DURABILITY, METHOD FOR MANUFACTURING SAME, AND FILTER UNIT COMPRISING SAME

CROSS REFERENCE TO RELATED APPLICATION

This application is a 35 U.S.C. 371 National Phase Entry Application from PCT/KR2017/014693, filed Dec. 14, 2017, which claims the benefit of Korean Patent Application No. 10-2016-0171514 filed on Dec. 15, 2016, the disclosures of which are incorporated herein in their entirety by reference.

TECHNICAL FIELD

The present invention relates to a water treatment filter, and more particularly, to a filter medium, which has excellent water permeability and high durability and secures mechanical strength capable of withstanding even high pressure in backwashing, a method of manufacturing the same, and a filter unit including the same.

BACKGROUND

Separation membranes used as filter media may be classified, according to pore sizes thereof, into a microfilter (MF) membrane, an ultrafiltration (UF) membrane, a nanofiltration (NF) membrane, and a reverse osmosis (RO) membrane.

Although the above separation membranes have differences in purpose and pore size, they are filtration media formed of fiber, porous polymer filtration media, or have the form of a composite membrane in common.

The porous polymer filtration medium is generally formed in which pores are formed in a polymer membrane or a polymer hollow fiber by sintering an additional pore-forming agent included in the production of a solution or by dissolving the pore-forming agent in an external coagulating solution. On the other hand, the filtration medium formed using fiber is generally manufactured by accumulating manufactured filaments and applying heat/pressure and the like thereto or generally manufactured by applying heat/pressure and the like simultaneously with spinning.

A representative example of the filtration medium formed using fiber is a non-woven fabric. In general, pores of a non-woven fabric are adjusted by a diameter of filaments, a basis weight of a medium, and the like. However, since a diameter of filaments included in a general non-woven fabric is in micron units, there is a limitation in implementing a separation membrane having a uniform microscale pore structure only by adjusting a diameter and basis weight of fiber. Accordingly, only using a general non-woven fabric, it is possible to implement only a separation membrane such as a microfilter membrane and it is difficult to implement separation membranes such as an ultrafiltration membrane and nano-separation membrane for filtering out finer particles.

As a method provided for solving this, there is a separation membrane manufactured using extra fine denier fiber having a nanoscale diameter. However, it is difficult to manufacture the extra fine denier fiber having the nanoscale diameter by only one time of spinning in a fiber spinning process such as a general wet-spinning. Also, when the extra fine denier fiber is spun as sea island yarn and the like and then a sea component is separately eluted to yield an island component which is the extra fine denier fiber, there are problems such as difficulties, an increase in cost, and prolonged manufacturing time. Accordingly, recently, a filtration medium formed of fiber has been manufactured by directly spinning a fiber having a nanoscale diameter through electrospinning.

Meanwhile, some of a variety of foreign substances included in water to be treated may remain in pores of a filter medium with which water treatment is repetitively performed, or an attached layer may be formed on a surface of the filter medium. Here, there is a problem in which foreign substances, which remain in the filter medium, degrade filtration performance.

To solve this, a method of preventing the occurrence of a fouling phenomenon as described above through pretreatment or a method of cleaning a filtration medium in which a fouling phenomenon has already occurred may be considered. Here, the cleaning of a filtration medium is generally removing foreign substances remaining in the filtration medium by applying high pressure to the filtration medium in a direction opposite to a path through which water to be treated flows in, is filtered by, and is discharged from the filtration medium. However, the high pressure applied while the filter medium is cleaned may cause damage to the filter medium, and a problem of delamination may occur in the case of a filter medium having a multilayer structure.

Also, high pressure may also be applied to the filter medium during a filtration process. In this case, the filtration medium is pressurized in a direction in which the pressure is applied, and a flow path is not easily secured such that a flow rate is significantly reduced.

Accordingly, it is urgently needed to develop a filter medium in which deformation and damage to a shape and structure of the medium are minimized while simultaneously easily providing a flow path so as to have a high flow rate and to treat water to be treated at a high speed even during a backwashing process performed at high pressure.

SUMMARY OF THE INVENTION

The present invention is directed to providing a filter medium in which deformation and damage to a shape and a structure of the filter medium in a water treatment operation are minimized while simultaneously a flow path is easily secured so as to have a high flow rate and a quick treatment speed, and a method of manufacturing the same.

The present invention is also directed to providing a filter medium in which a flow path can be secured at high pressure and delamination, damage to a membrane, and the like can be minimized, and durability is high in a backwashing process, and a method of manufacturing the same.

The present invention is also directed to providing a flat filter unit and a filter module which are variously applicable to the water treatment field using a filter medium having excellent water permeability and durability.

One aspect of the present invention provides a filter medium including a second support and a nanofiber web sequentially laminated on each of both sides of a first support and having a flow path through which a filtrate filtered by the nanofiber web flows toward the first support. Here, the nanofiber web has a basis weight equal to or smaller than 30 g/m$^2$, and the first support has a basis weight equal to or greater than 250 g/m$^2$ and a thickness equal to or greater than 90% of an overall thickness of the filter medium.

The thickness of the first support may be equal to or greater than 95%, and preferably, 95 to 98% of the overall thickness of the filter medium.

The first support may have a basis weight of 250 to 800 g/m$^2$, and preferably, 350 to 600 g/m$^2$.

The thickness of the first support may be 2 to 8 mm, preferably, 2 to 5 mm, and more preferably, 3 to 5 mm.

The first support and the second supports may, independently, be any one or more of a non-woven fabric, a woven fabric, and a knitted fabric. More preferably, the first support and the second support may be a non-woven fabric.

The second support may include a second composite fiber which includes a support component and a low melting point component and is disposed to expose at least a part of the low melting point component at an outer surface, and the low melting point component of the second composite fiber may be fused with the nanofiber web. Here, the support component and the low melting point component may be polyolefin polymer compounds.

The first support of the filter medium may include a first composite fiber which includes a support component and a low melting point component and is disposed to expose at least a part of the low melting point component at an outer surface, and the first support and the second supports may be bonded through fusion between the low melting point component of the first composite fiber and a low melting point component of a second composite fiber. Also, the support component and the low melting point component of each of the first composite fiber and the second composite fiber may be polyolefin polymer compounds.

A basis weight of the second support may be 1.5 to 6 times the basis weight of the nanofiber web, and a basis weight of the first support may be 8 to 16.5 times the basis weight of the second support.

The nanofiber web may include a fluorine-based compound as a fiber-forming component, and the fluorine-based compound may include one or more compounds selected from the group consisting of polytetrafluoroethylene (PTFE), a tetrafluoroethylene-perfluoroalkyl vinyl ether (PFA) copolymer, a tetrafluoroethylene-hexafluoropropylene (FEP) copolymer, a tetrafluoroethylene-hexafluoropropylene-perfluoroalkyl vinyl ether (EPE) copolymer, a tetrafluoroethylene-ethylene (ETFE) copolymer, polychlorotrifluorooethylene (PCTFE), a chlorotrifluoroo-ethylene-ethylene (ECTFE) copolymer, and poly(vinylidene fluoride) (PVDF).

The nanofiber web may have an average pore diameter of 0.1 to 3 μm and a porosity of 60 to 90%.

A nanofiber which forms the nanofiber web may have an average diameter of 50 to 450 nm.

The second support may have a basis weight of 35 to 100 g/m$^2$ and a thickness of 150 to 250 on.

The filter medium may be an ultrafiltration membrane.

Another aspect of the present invention provides a method of manufacturing a filter medium, including (1) laminating a nanofiber web with a second support; and (2) disposing and laminating the nanofiber web and the second support, which are laminated, on each of both sides of a first support such that the second support comes into contact with the first support. Here, the nanofiber web has a basis weight equal to or smaller than 30 g/m$^2$, the first support has a basis weight equal to or greater than 250 g/m$^2$ and a thickness equal to or greater than 90% of an overall thickness of the filter medium.

The operation (1) may include (1-1) forming the nanofiber web by electrospinning a nanofiber on the second support and (1-2) laminating the nanofiber web with the second support by applying heat and pressure to both sides of the second support on which the nanofiber web is formed.

Still another aspect of the present invention provides a flat filter unit including the filter medium according to the present invention and a support frame including a flow path, through which a filtrate filtered by the filter medium is discharged to the outside, and supporting an edge of the filter medium.

Yet another aspect of the present invention provides a filter module including a plurality of filter units according to the present invention, which are spaced a certain interval apart.

According to the present invention, in a filter medium, deformation and damage to a shape and a structure of the filter medium may be minimized and a flow path may be easily secured so as to have a high flow rate in a water treatment operation. Also, since an extended use period is provided due to excellent durability of the filter medium even at an applied high pressure, the filter medium may be variously applied to a variety of water treatment fields.

BRIEF DESCRIPTION OF DRAWINGS

FIG. 1 is a cross-sectional view of a filter medium according to one embodiment of the present invention;

FIG. 2 is a photo of a swollen filter medium which is delaminated by backwashing after a cleaning solution is trapped therein;

FIG. 3 is a schematic diagram illustrating the direct lamination of a first support with a nanofiber web;

FIGS. 4A and 4B are schematic diagrams illustrating the lamination of the filter medium, in which FIG. 4A is a view illustrating the lamination of the nanofiber web with a second support, and FIG. 4B is a view illustrating the disposition and lamination of the nanofiber web and the second support, which are laminated, on both sides of the first support, wherein 'B' in FIG. 4A and 'C' in FIG. 4B illustrate a fused portion;

FIGS. 5A and 5B are electron microscope photos of the nanofiber web included in one embodiment of the present invention, in which FIG. 5A is a photo of a surface of the nanofiber web, and FIG. 5B is a photo of a cross section of the nanofiber web;

FIG. 7 is a view illustrating a flat filter unit according to one embodiment of the present invention in which

Figure 5A:
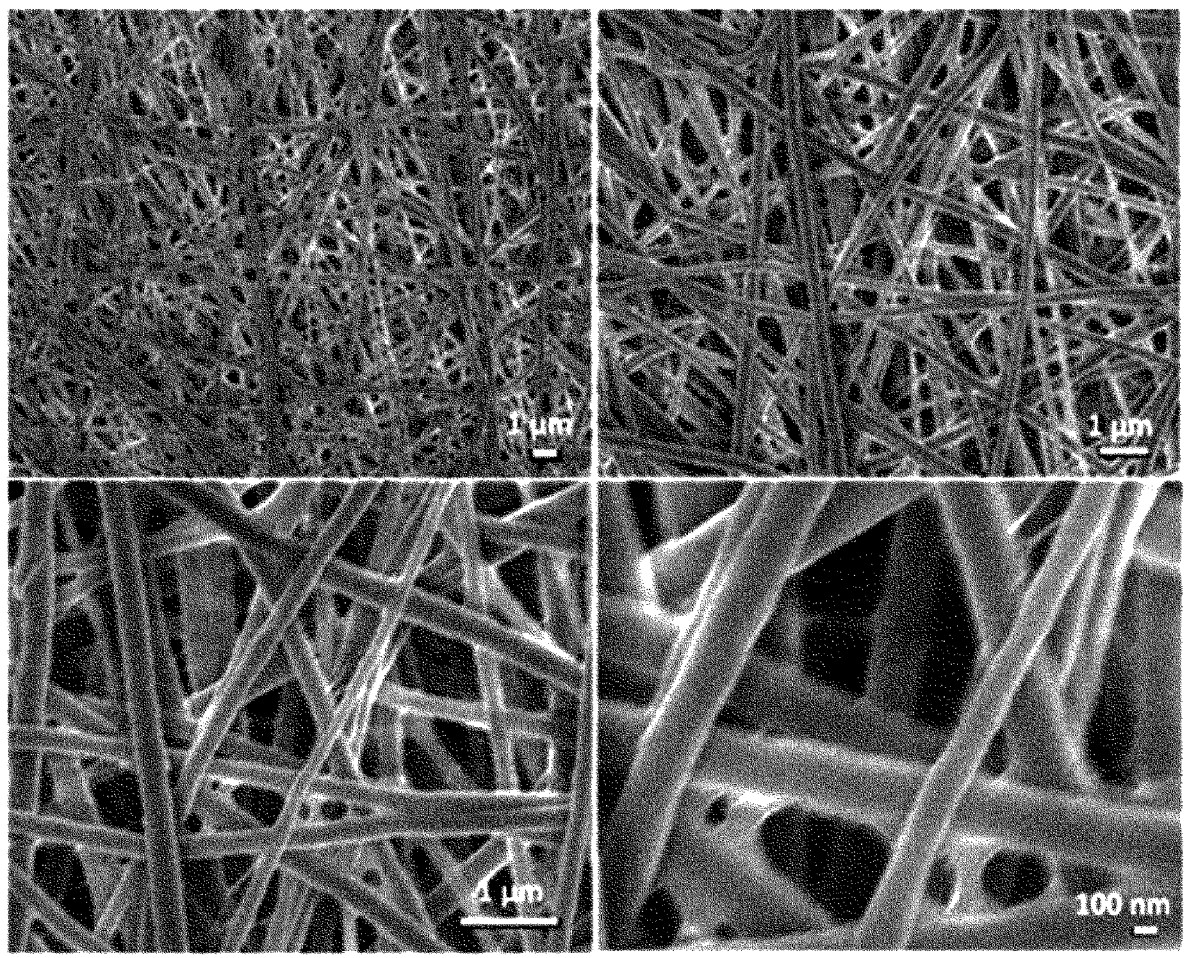

Hereinafter, embodiments of the present invention will be described in detail with reference to the attached drawings so that one of ordinary skill in the art can easily carry out the present invention. The present invention may be embodied in a variety of different shapes and is not limited to the embodiments disclosed herein. In order to clearly describe the present invention, parts irrelevant to the present invention are omitted, and the same or similar components are assigned the same reference numerals throughout the drawings.

As shown in FIG. 1, a filter medium 1000 according to one embodiment of the present invention includes second supports 121 and 122 and nanofiber webs 111 and 112 sequentially laminated on both sides of a first support 130 and has a filtration path in which a filtrate filtered by the nanofiber webs 111 and 112 flows toward the first support 130.

As shown in FIG. 1, the filter medium 1000 according to the present invention has a structure including at least five layers and includes two types of supports 121/122 and 130 having different thicknesses. Before describing each of the layers forming the filter medium 1000, a reason for needing a thickness of the first support 130, which is equal to or greater than 90% of an overall thickness of the filter medium and a reason for including the second supports in addition to the first support in the filter medium will be described first.

As a water treatment process using a filter medium is repetitively performed, foreign substances, which are included in water to be treated, adhere to the filter medium and form an adhesive layer or are stuck to an inside of the filter medium and block a flow path and degrade a filtration function. When the filter medium is replaced whenever such problems occur, costs required for water treatment increase. Accordingly, to extend a use period of the filter medium, it is necessary to perform a cleaning process of removing foreign substances adhering to or stuck to the filter medium by periodically applying a physical stimulus to the filter medium, which is referred to as backwashing. Generally, in backwashing, foreign substances attached or stuck to a filter medium are removed by strongly applying cleaning water or blowing air in a direction opposite to a filtration direction of the filter medium. Here, to supply cleaning water and/or air to the filter medium and simultaneously remove foreign substances, it is necessary to supply the cleaning water or air at a higher pressure than a pressure applied to the filter medium in a filtration process.

Accordingly, to allow the filter medium to have a backwashing ability, it is necessary that the filter medium has mechanical strength such that it is not deformed or damaged even at an applied high pressure and the filter medium includes supports for reinforcing the mechanical strength. As factors which influence the mechanical strength of a support, a structure of the support, for example, in the case of the support being a non-woven fabric, there may be a diameter of a fiber which forms the non-woven fabric, a fiber length, the manner of bonding between fibers, a thickness, and a basis weight. Here, as the thickness is greater or the basis weight is greater, the mechanical strength of the support may increase. Accordingly, as an example of designing a filter medium resistant to backwashing, a non-woven fabric having a greater thickness or a non-woven fabric having a very large basis weight even with a relatively small thickness may be used for a support.

Meanwhile, the support may have a large pore diameter so as not to affect a flow of a filtrate in the filter medium. A decrease in a flow rate caused by the support for supplementing mechanical strength degrades main properties of the filter medium, which is undesirable. As an example, when a non-woven fabric, which realizes adequate mechanical strength even with a small thickness, is used as the support, since a basis weight of the non-woven fabric is very large, a diameter of pores and porosity of the non-woven fabric are very small and affect a flow of a filtrate of the filter medium such that a desirable flow rate may not be secured.

Accordingly, to secure an adequate flow path and ensure the mechanical strength of the filter medium, the filter medium 1000 according to the present invention includes the nanofiber webs 111 and 112 having a basis weight equal to or smaller than 30 $g/m^2$ and the first support 130 having a thickness equal to or greater than 90% of an overall thickness of the filter medium and a basis weight equal to or greater than 250 $g/m^2$. In the filter medium including the nanofiber webs having the basis weight equal to or smaller than 30 $g/m^2$, the thickness of the first support 130 may occupy 90% or more, and preferably, 95 to 98% of the overall thickness of the filter medium. When the first support is less than 90% of the overall thickness of the filter medium, the filter medium including the nanofiber webs having a basis weight equal to or smaller than 30 $g/m^2$ does not have adequate mechanical strength and has difficulty in performing backwashing such that a replacement period of the filter medium may decrease. However, when the basis weight of the first support is small even while the thickness of the first support satisfies 90% or more of the overall thickness of the filter medium, there is a problem in which adequate mechanical strength is not provided. Accordingly, the basis weight of the first support may be equal to or greater than 250 $g/m^2$. When the basis weight of the first support is less than 250 $g/m^2$, since mechanical strength against backwashing is not provided, the medium may be damaged such that durability may be reduced. Also, since a specific surface area of contact between fibers of the first support and the nanofiber webs is reduced, adhesion with the nanofiber webs may be significantly reduced.

Also, when mechanical strength adequate for withstanding backwashing is provided while the first support is less than 90% of the overall thickness of the filter medium, the first support impede a flow of a filtrate such that there may be a decrease in a flow rate, which is very undesirable. Preferably, the first support 130 may have a basis weight equal to or smaller than 800 $g/m^2$. When the basis weight of the first support 130 exceeds 800 $g/m^2$, although mechanical strength may be provided, a flow rate may be significantly reduced.

However, when adhesion between the first support 130 and the nanofiber webs 111 and 112, which function as the medium, is weak, although mechanical strength is very high, the durability of the filter medium may be degraded by backwashing. That is, a high pressure applied during a backwashing process may accelerate interfacial separation between layers which forms the filter medium. In this case, as shown in FIG. 2, a swelling phenomenon of a separation membrane may occur during the backwashing process and a function as the separation membrane may be significantly degraded or completely lost.

Accordingly, a certain level or more of adhesion between the first support, which has a significantly increased thickness, and the nanofiber webs as the medium has a very significant meaning in realizing the filter medium which provides durability adequate against a high pressure applied in backwashing and frequent backwashing.

Generally, as a method of attaching the support and the nanofiber web, an additional bonding material may be used or a low melting point component of the support is fused with the nanofiber web such that two layers may be bonded. However, when two layers are bonded using the additional bonding material, the bonding material may be dissolved by water to be treated such that a filtrate may be contaminated and water permeability may be degraded. When the filter medium, in which the bonding material partially dissolves, is backwashed and a swelling phenomenon of the filter medium is severe, the nanofiber web is delaminated such that the function as the filter medium may be completely lost.

Accordingly, preferably, a method of bonding the nanofiber web with the support through fusion A may be employed. To this end, as shown in FIG. 3, a support 1 and a nanofiber web, which are laminated, may be bonded by applying heat and/or pressure to both sides thereof. However, when they are bonded by applying heat and/or pressure, it is necessary to minimize the deformation of the nanofiber web 2, which functions as a medium, caused by the applied heat and/or pressure. When the nanofiber web is physically or chemically deformed during a thermal bonding process, properties of the initially designed filter medium, such as a flow rate, filtration efficiency, and the like, may be changed.

Meanwhile, when conditions of heat and/or pressure are selected in order to prevent physical/chemical deformation of the nanofiber web 2, it is necessary to consider material properties of the nanofiber web and the support, for example, melting point, heat conductivity, heat capacity, and the like. In general, the low melting point component of the support may be fused with the nanofiber web by applying heat at a temperature equal to or higher than the melting point or heat equal to or higher than the melting point and pressure at the same time. The low melting point component may be fused with the nanofiber web by applying high pressure even when the temperature is slightly lower than the melting point.

However, a material for forming the support or the nanofiber web is a polymer compound. Since the polymer compound has a low heat conductivity and a high heat capacity, even when heat H1 and H2 is respectively applied to both sides as shown in FIG. 3, it is necessary to continuously apply heat for a long time in order to increase a temperature of the low melting point component provided in the support 1 to the melting point by the heat H1 and H2 which arrives at an interface between the nanofiber web 2 and the support 1. Additionally, when a thickness of the support 1 is very large as shown in FIG. 3, it takes a long time for the heat H2 transferred from below to be transferred to a vicinity of the interface between the nanofiber web 2 and the support 1 and increase the temperature of the low melting point component included in the support at the corresponding vicinity to the melting point. Accordingly, in order to reduce time, it is necessary to apply more heat from below. However, when excessively more heat is applied from below, melting of the low melting point component may occur first below the first support such that a shape and a structure of the support may be changed.

As another method, the difficulty caused by the thickness of the support 1 may be solved by increasing the heat H1 applied from above. However, in this case, physical/chemical deformation of the nanofiber web 2 may be caused, and properties of the initially designed filter medium may not be completely manifested.

Also, when the thickness of the support 1 is very large, a diameter of fibers forming the support 1 may be very large such that adhesion may be degraded due to a very small contact area between the support 1 and the nanofiber web 2 when they are laminated. Accordingly, the support and the nanofiber web may be easily delaminated during backwashing or the nanofiber web 2 may swell.

Accordingly, in the filter medium 1000 according to one embodiment of the present invention, the first support 130 and the nanofiber webs 111 and 112 do not come into direct contact with each other and the second supports 121 and 122, which have smaller thickness than the first support 130, are interposed therebetween. Through this, an interlayer attachment process may be more stably and easily performed, significantly excellent adhesion may be exhibited at an interface between layers, and separation and delamination between layers may be reduced even when a high external force is applied due to backwashing and the like.

Referring to FIG. 4A, since a difference between thicknesses of the nanofiber web 2 and a second support 3, which occupies less than 10% of an overall thickness of the filter medium, is significantly smaller than a difference between thicknesses of the nanofiber web 2 and a first support 1, heat H1 and H2 applied from above and below the laminated nanofiber web 2/the second support 3 reach an interface therebetween such that a fused portion B is more easily formed than in FIG. 3. Also, since it is easier than FIG. 3 to adjust an amount and time of applied heat, it is advantageous for preventing physical/chemical deformation of the nanofiber web 2. Also, due thereto, when the nanofiber web 2 is bonded to the second support 3 as shown in FIG. 4A, the nanofiber may be bonded to the support with excellent adhesion without changes in properties of the initially designed nanofiber web 2.

Meanwhile, to allow the second supports 121 and 122 to exhibit excellent adhesion with each of the first support 130 and the nanofiber webs 111 and 112, preferably, a basis weight of the second supports 121 and 122 may be 1.5 to 6 times the basis weight of the nanofiber webs 111 and 112, and a basis weight of the first support 130 may be 8 to 16.5 times the basis weight of the second supports 121 and 122. When the basis weight of the second supports does not satisfy the above range of any one of the basis weights of the first support/the nanofiber webs, a risk of delamination in backwashing may be high due to a decrease in adhesion, backwashing efficiency may be degraded, and/or a flow rate may be significantly reduced.

Hereinafter, each component included in the filter medium 1000 will be described in detail.

First, the first support 130 supports the filter medium 1000 and forms a large flow path to more smoothly perform a filtration process or a backwashing process. In detail, when a pressure gradient is formed such that an internal pressure of the filter medium is lower than an external pressure thereof during the filtration process, the filter medium may be compressed. In this case, a flow path through which the filtrate is flowable in the filter medium may be significantly reduced or blocked such that a higher differential pressure is applied to the filter medium while simultaneously a flow rate may be significantly degraded. Also, an external force for expansion may be applied from the inside of the filter medium toward the outside in both directions during the backwashing process. When a mechanical strength is low, the filter medium may be damaged by the applied external force.

The first support 130 may be provided to prevent the above problems which occur during the filtration process and/or the backwashing process, may be used in the water treatment field, and may be a well-known porous member which secures mechanical strength. For example, the first support may be a non-woven fabric, a woven fabric, or a knitted fabric.

The woven fabric refers to fabric including fibers oriented in longitudinal and transverse directions. Specific structures may be plain weaves, twilled weaves, and the like, and densities of weft and warp are not particularly limited. Also, the knitted fabric may be a well-known knitted structure, may be a weft-knitted fabric, a warp-knitted fabric, and the like, and for example, may be tricot in which threads are weft-knitted. Also, as shown in FIG. 1, the first support 130 may be a non-woven fabric in which a fiber is not oriented in longitudinal and transverse directions, and a dry non-woven fabric such as a chemical-bonded non-woven fabric, a thermal-bonded non-woven fabric, an aerated non-woven fabric, and the like, a wet non-woven fabric, a spanless non-woven fabric, a well-known non-woven fabric manufactured using a variety of methods such as a needle-punched non-woven fabric and a melt-blown fabric may be used.

To exhibit adequate mechanical strength, the first support 130 is configured to have a thickness equal to or greater than 90% of an overall thickness of the filter medium as described above. As an example, the thickness of the first support 130 may be 2 to 8 mm, and preferably, 2 to 5 mm, and more preferably, 3 to 5 mm. When the thickness is less than 2 mm, adequate mechanical strength which withstands frequent backwashing may not be provided. Also, in the case of a thickness more than 8 mm, when the filter medium is provided as a filter unit, which will be described below, and then a plurality of such filter units are provided as a filter module having a limited space, a degree of integration of the filter medium per unit volume of the module may be reduced.

Preferably, the first support 130 may satisfy the above thickness condition while having the basis weight of 250 to 800 $g/m^2$, more preferably, 350 to 600 $g/m^2$. When the basis weight is less than 250 $g/m^2$, it may be difficult to provide adequate mechanical strength and an adhesive force with the second support may be reduced. When the basis weight exceeds 800 $g/m^2$, an adequate flow rate may not be formed, a flow path may be reduced, and it may be difficult to smoothly perform backwashing due to an increase in differential pressure.

Also, when the first support 130 is formed of fiber such as a non-woven fabric, an average diameter of the fiber may be 5 to 50 µm, preferably, 20 to 50 µm, and more preferably, 25 to 40 µm. In consideration of a diameter of fiber forming the second supports 121 and 122, an increase in a contact area between the first support and the second supports when they are laminated, and adhesion increased thereby may be provided. As an example, a diameter of the fiber may be 35 µm. Also, the average pore diameter of the first support 130 may be 20 to 200 µm, and preferably, 30 to 180 µm. As an example, the average pore diameter of the first support 130 may be 100 µm. A porosity thereof may be 50 to 90%, and preferably, 55 to 85%. For example, the first support 130 may have a porosity of 70%, but is not limited thereto. Any porosity and pore diameter capable of providing a target level of mechanical strength while simultaneously easily forming a flow path even at high pressure by supporting nanofiber webs 111 and 112, which will be described below, during the filtration process and/or the backwashing process are usable without limitation.

As the first support 130, any material, which is usable as a support of a separation membrane, may be used without limitation. As a non-limiting example thereof, a synthetic polymer component selected from the group consisting of polyester, polyurethane, a polyolefin, and polyamide, or a natural polymer component including cellulose may be used. However, when the first support has strong brittleness, it may be difficult to provide a target level of adhesion in a process of laminating the first support with the second support. This is because the first support does not have a smooth surface like a film and may have an uneven surface having porosity. The surface formed by fibers such as a non-woven fabric may have an unsmooth surface according to an arrangement of fibers, denier of fibers, and the like, and a degree thereof may be different for each position. When a part, which is not in close contact with an interface between two laminated layers, is present and other parts are joined, delamination between layers may begin due to the part which is not in close contact. To solve this, it is necessary to perform a lamination process while pressures are applied to the two layers from both sides thereof such that an adhesion degree of the two layers is increased. However, in the case of a support having high brittleness, even when a pressure is applied, there is a limit in increasing adhesion. Since the support may be damaged when a higher pressure is applied, a material having high flexibility and a high elongation rate may be suitable as a material of the first support. Preferably, the first support 130 may have a polyolefin material to have excellent adhesion with the second supports 121 and 122.

Meanwhile, the first support 130 may include a low melting point component to be bonded to both the second supports 121 and 122 without an additional adhesive or adhesive layer. When the first support 130 is whole cloth such as a non-woven fabric, the first support may be manufactured using a first composite fiber 130a including a low melting point component. The first composite fiber 130a may include a support component and a low melting point component and may be disposed such that at least a part of the low melting point component is exposed at an outer surface. As an example, the first composite fiber may be a sheath-core type composite fiber, in which the support component forms a core portion and the low melting point component surrounds the core portion, or a side-by-side composite fiber in which the low melting point component is disposed on one side of the support component. As described above, in terms of flexibility and an elongation rate of the support, the low melting point component and the support component may be a polyolefin. For example, the support component may be polypropylene and the low melting point component may be polyethylene. A melting point of the low melting point component may be 60 to 180° C., and preferably, 100 to 140° C. such that it is advantageous for achieving an object of the present invention such as exhibiting adhesion with excellent strength without damage to the nanofiber webs and the second supports.

Next, the second supports 121 and 122, which are disposed on both sides of the first support 130, will be described.

The second supports 121 and 122 support the nanofiber webs 111 and 112, which will be described below, and increase adhesion of layers provided in the filter medium.

The second supports 121 and 122 are not particularly limited as long as they can serve as supports of the filter medium, and may preferably be in the form of a woven fabric, a knitted fabric, or a non-woven fabric. The woven fabric refers to fabric including fibers oriented in longitudinal and transverse directions. Specific structures may be plain weaves, twilled weaves, and the like, and densities of weft and warp are not particularly limited. Also, the knitted fabric may be a well-known knitted structure and may be a weft knitted fabric, a warp knitted fabric, and the like, but is not limited particularly. Also, the non-woven fabric means that fibers included therein are not oriented in longitudinal and transverse directions. A dry non-woven fabric such as a chemical-bonded non-woven fabric, a thermal-bonded non-woven fabric, an aerated non-woven fabric, and the like, a wet non-woven fabric, a spanless non-woven fabric, a well-known non-woven fabric manufactured using a variety of methods such as a needle-punched non-woven fabric and a melt-blown fabric may be used.

As an example, the second supports 121 and 122 may be a non-woven fabric. Here, fibers which form the second supports 121 and 122 may have an average diameter of 5 to 30 µm, preferably, 10 to 25 µm. Through this, in consideration of a diameter of fiber which forms the above-described first support 130 and a diameter of fibers which form both the nanofiber webs 111 and 112, an increase in a contact area between the first support and the second supports when they are laminated, an increase in a contact area between the second supports and the nanofiber webs when they are laminated, and increased adhesion caused thereby may be provided. Also, a thickness of the second supports 121 and 122 may be 100 to 400 µm, preferably, 150 to 400 µm, more preferably, 150 to 250 µm, and for example, 200 µm. When the thickness of the second support is less than 100 µm, it may be difficult to provide adequate mechanical strength in backwashing, and particularly, adhesion with the first support and/or the nanofiber webs may be degraded. Alternatively, since a basis weight thereof excessively increases, water permeability may be degraded and delamination may occur in backwashing. Also, when the thickness exceeds 400 µm, thermal bonding in lamination with the nanofiber webs may not be easily performed such that delamination may occur in backwashing.

Also, the second supports 121 and 122 may have an average pore diameter of 20 to 100 µm and a porosity of 50 to 90%. However, the second supports are not limited thereto, and any porosity and pore diameter capable of providing a target level of mechanical strength by supporting the above-described nanofiber webs 111 and 112 and simultaneously not impeding a flow of a filtrate which flows in through the nanofiber webs 111 and 112 may be used without limitation.

Also, the basis weight of the second supports 121 and 122 may be 35 to 100 g/m², more particularly, 35 to 75 g/m², and for example, 40 g/m². When the basis weight is less than 35 g/m², an amount of fibers which form the second supports and are distributed on an interface with the nanofiber webs 111 and 112, which will be described below, may be small such that an effective adhesion area of the second supports in contact with the nanofiber webs is reduced and a target level of adhesion may not be provided. Also, there may be problems in which adequate mechanical strength capable of supporting the nanofiber web is not provided and adhesion with the first support is reduced. Also, when the basis weight exceeds 100 g/m², it may be difficult to secure a target flow rate and difficult to easily perform backwashing due to an increase in a differential pressure.

As the second supports 121 and 122, any material, which is used as a support of the filter medium, may be used without limitation. As a non-limiting example thereof, a synthetic polymer component selected from the group consisting of polyester, polyurethane, a polyolefin, and polyamide, or a natural polymer component including cellulose may be used.

However, the second supports 121 and 122 may be a polyolefin polymer component to improve adhesion between the nanofiber webs 111 and 112, which will be described below, and the above-described first support 130. Also, when the second supports 121 and 122 are whole cloth such as a non-woven fabric, the second supports may be manufactured using a second composite fiber 121a including a low melting point component. The second composite fiber 121a may include a support component and a low melting point component and may be disposed such that at least a part of the low melting point component is exposed at an outer surface. As an example, the second composite fiber may be a sheath-core type composite fiber, in which the support component forms a core portion and the low melting point component surrounds the core portion, or a side-by-side composite fiber in which the low melting point component is disposed on one side of the support component. As described above, in terms of flexibility and an elongation rate of the support, the low melting point component and the support component may be a polyolefin. For example, the support component may be polypropylene and the low melting point component may be polyethylene. A melting point of the low melting point component may be 60 to 180° C., and preferably, 100 to 140° C. such that it is advantageous for achieving an object of the present invention such as exhibiting adhesion with excellent strength without damage to the nanofiber webs.

When the above-described first support 130 is implemented using the first composite fiber 130a including the low melting point component to provide a more improved adhesive force with the second supports 121 and 122, a more strongly fused portion caused by fusion of the low melting point component of the first composite fiber 130a and the low melting point component of the second composite fiber 121a may be formed at an interface between the first support 130 and the second support 121. Here, in terms of compatibility, the first composite fiber 130a and the second composite fiber 121a may be made of the same type of material.

Next, the nanofiber webs 111 and 112 disposed on the above-described second supports 121 will be described. The nanofiber webs 111 and 112 may have a three-dimensional network structure in which one or several strands of nanofiber are randomly laminated three-dimensionally (refer to FIG. 5).

The nanofiber which forms the nanofiber webs may be formed from a well-known fiber-forming component. However, preferably, a fluorine-based compound may be included as the fiber-forming component to provide excellent chemical resistance and heat resistance. Through this, although water to be treated is a strong acid/strong alkali solution or a high-temperature solution, filtration efficiency/flow rate at a target level and a long use period may be provided without change in properties of the filter medium. As the fluorine-based compound, any one of well-known fluorine-based compounds capable of being manufactured using nanofiber may be used without limitation, and for example, may include one or more compounds selected from the group consisting of polytetrafluoroethylene (PTFE), a tetrafluoroethylene-perfluoroalkyl vinyl ether (PFA) copolymer, a tetrafluoroethylene-hexafluoropropylene (FEP) copolymer, a tetrafluoroethylene-hexafluoropropylene-perfluoroalkyl vinyl ether (EPE) copolymer, a tetrafluoroethylene-ethylene (ETFE) copolymer, polychlorotrifluorooethylene (PCTFE), a chlorotrifluorooethylene-ethylene (ECTFE) copolymer, and poly(vinylidene fluoride) (PVDF). More preferably, in terms of a low manufacturing cost, easily mass-producing nanofiber by electrospinning, excellent mechanical strength, and chemical resistance, the fluorine-based compound may be PVDF. Here, when the nanofiber includes PVDF as a fiber-forming component, a weight average molecular weight of the PVDF may be 10,000 to 1,000,000, and preferably, 300,000 to 600,000, but is not limited thereto.

The nanofiber may have an average diameter of 0.05 to 1 µm, preferably, 50 to 450 nm, and for example, 250 nm. When the average diameter of the nanofiber is less than 50 nm, porosity and permeability may be degraded. When the average diameter is more than 1 µm, filtration efficiency may be degraded and tensile strength may be degraded. Also, the nanofiber may have an aspect ratio of 1,000 to 100,000, but is not limited thereto. As an example, the nanofibers included in the nanofiber webs 111 and 112 may include a first nanofiber group having a diameter of 0.1 to 0.2 µm, a second nanofiber group having a diameter of 0.2 to 0.3 µm, and a third nanofiber group having a diameter of 0.3 to 0.4

μm at 25 to 45 wt %, 40 to 60 wt %, and 5 to 15 wt %, respectively, with respect to an overall weight of the nanofiber web such that mechanical strength against backwashing may be further improved by more improved adhesion with the second supports, an increase in own mechanical strength, and the like and it may be more advantageous for achieving an object of the present invention such as filtration efficiency, provision of an excellent flow rate, and the like. As an example, the first nanofiber group having the diameter of 0.1 to 0.2 μm, the second nanofiber group having the diameter of 0.2 to 0.3 μm, and the third nanofiber group having the diameter of 0.3 to 0.4 μm may be included at 35 wt %, 53 wt %, and 12 wt %, respectively.

The thicknesses of the nanofiber webs 111 and 112 may be 0.5 to 200 μm, and preferably, 10 to 50 μm, and for example, 20 μm. When the thickness is less than 0.5 μm, since it is difficult to withstand backwashing due to a decrease in mechanical strength, a risk of damage is very large. Also, since a pore diameter is excessively decreased, a flow rate may be significantly reduced. Also, when the thickness exceeds 200 μm, a decrease in a flow rate, swelling or delamination caused by backwashing may occur. The porosity of the nanofiber webs 111 and 112 may be 40 to 90%, and preferably, 60 to 90%. Also, a pore diameter thereof may be 0.1 to 5 μm, preferably, 0.1 to 3 μm, and for example, 0.25 μm. When the average pore diameter of the nanofiber webs is less than 0.1 μm, water permeability with respect to a solution to be filtered may be degraded. When the average pore diameter exceeds 5 μm, filtration efficiency with respect to contaminants may not be high.

Also, one or more layers of the nanofiber webs 111 and 112 may be included in the filter medium 1000. Here, porosity, a pore diameter, a basis weight, a thickness, and/or the like of each nanofiber web may be different.

Meanwhile, the nanofibers which form the nanofiber webs 111 and 112 may be modified to increase hydrophilicity. As an example, a hydrophilic coating layer may be further provided on at least a part of an outer surface of the nanofiber. When the nanofiber includes the fluorine-based compound as described, the fluorine-based compound has very strong hydrophobicity such that a flow rate is not high when water to be treated is a hydrophilic solution. Meanwhile, even when a surface of the nanofiber including the fluorine-based compound is coated with a hydrophilic coating to solve this, since a hydrophilic material is applied to the surface of the hydrophobic nanofiber, a coating layer may not be formed well and easily peeled off even when formed such that durability is not high. Also, when a thick hydrophilic coating layer is formed, a pore structure of a fiber web layer is changed such that properties of the initially designed fiber web layer may not be completely manifested. In addition, in the case of nanofiber implemented by a fiber-forming component formed by mixing a hydrophilic component with the fluorine-based compound to solve this, since miscibility between compounds is small due to two different natures thereof, it is difficult to manufacture a nanofiber through electrospinning or it is difficult to use the manufactured nanofiber as a filter medium due to significantly low mechanical strength.

To prevent this, a hydrophilic coating layer may be further included on the surface of the hydrophobic nanofiber. The hydrophilic coating layer may be well known, and as an example, may be formed including a hydrophilic polymer including a hydroxyl group or formed by crosslinking the hydrophilic polymer using a crosslinking agent. As an example, the hydrophilic polymer may be any one of PVA, EVOH, sodium alginate, and the like, and a mixture thereof, and most preferably, PVA. Also, as the crosslinking agent, any well-known crosslinking agent including a functional group capable of being crosslinked with a hydroxyl group included in the hydrophilic polymer through a condensation reaction and the like may be used without limitation. As an example, the functional group may be one of a hydroxyl group, a carboxyl group, and the like.

The hydrophilic coating layer may be formed by crosslinking PVA with a crosslinking agent including a carboxyl group in order to provide more enhanced physical properties. Here, the PVA may have a degree of polymerization of, preferably, 500 to 2,000, more preferably, 1,500 to 2,000 and a degree of saponification of 85 to 90%. In detail, a weight average molecular weight may be 20,000 to 100,000, preferably, 50,000 to 100,000. When the weight average molecular weight of PVA is less than 20,000, a hydrophilic coating layer may not be easily formed or may be easily delaminated even when formed such that hydrophilicity may be not be increased to a desirable level. Also, when the weight average molecular weight exceeds 100,000, a hydrophilic coating layer may be formed excessively such that a pore structure of a nanofiber web may be changed or pores may be blocked. Also, when a degree of saponification is less than 85%, the hydrophilic coating layer may be formed unstably and a degree of improvement of hydrophilicity may be insignificant. When the degree of saponification exceeds 90%, due to strong hydrogen bonding between PVA molecules, the PVA may not be easily dissolved in a solvent even at high temperature. Even when the PVA is dissolved, complete dissolution is difficult such that it may be difficult to prepare a solution for forming the hydrophilic coating layer. Accordingly, the hydrophilic coating layer may not be adequately formed. Even when formed, the hydrophilic coating layer may be non-uniformly formed and some pores may be blocked such that desired effects may not be exhibited.

The crosslinking agent may be a component including a carboxyl group to be crosslinked with the above-described PVA. As an example, the crosslinking agent may include one or more types of materials selected from the group consisting of poly(acrylic acid-maleic acid), polyacrylic acid, and poly(styrene sulfonic acid-maleic acid). Also, the crosslinking agent may be a multi-functional crosslinking agent including three or more carboxyl groups to be thinly coated while simultaneously providing a more improved flow rate in order to prevent a coating property/adhesive property of a hydrophilic coating layer formed on the nanofiber and a pore structure of a fiber web layer 111 from being changed even when a surface of nanofiber has strong hydrophobicity. When the crosslinking agent includes less than three carboxyl groups, it is difficult to form a coating layer on the surface of the hydrophobic nanofiber. Even when the coating layer is formed, the coating layer may be easily peeled off due to low adhesion. As an example, the crosslinking agent including three or more carboxyl groups may be poly(acrylic acid-maleic acid), more preferably, poly(acrylic acid-maleic acid) having a weight average molecular weight of 3,000 to 8,0000.

Also, the hydrophilic coating layer may be formed by crosslinking 5 to 20 parts by weight, preferably, 10 to 20 parts by weight of the crosslinking agent including a carboxyl group with respect to 100 parts by weight of the above-described PVA. When the crosslinking agent is included at less than 5 parts by weight, formability of the hydrophilic coating layer may be degraded and chemical resistance and mechanical strength may be degraded. Also, when the crosslinking agent is included at more than 20 parts by weight, flocculation of the crosslinking agent occurs in a hydrophilic coating composition such that a crosslinking reaction is not uniformly performed. Accordingly, a coating layer may be non-uniformly formed or pores are reduced by the coating layer such that a flow rate may be degraded.

Meanwhile, the hydrophilic coating layer may be formed on a part of an outer surface of the nanofiber or may be formed on an entirety of the outer surface of the nanofiber. Here, the nanofiber may be coated with 0.1 to 2 g of the hydrophilic coating layer per unit area (m$^2$) of the fiber web. When less than 0.1 g of the hydrophilic coating layer is applied per unit area (m$^2$) of the fiber web, it is difficult to obtain a desirable degree of a flow rate. When more than 2 g of the hydrophilic coating layer is applied per unit area (m$^2$) of the fiber web, some pores are blocked and a pore structure is changed such that it is not possible to obtain a desirable filtration rate/flow rate using the initially designed nanofiber web.

Meanwhile, as the outer surface of the nanofiber in the nanofiber webs 111 and 112 is modified to include a hydrophilic coating layer, an average value of initial wetting angles at five randomly different points at an exposed surface of the nanofiber web may be equal to or smaller than 40°, preferably, 30°, more preferably, 20°, still more preferably, 12°, and further preferably, 5°. Through this, despite the nanofiber web having a hydrophobic material, an improved flow rate may be secured. The initial wetting angle refers to a wetting angle measured within 20 seconds after a droplet is formed on a specimen. In the case of the nanofiber web, due to a porous structure, since the wetting angle may decrease when a droplet initially formed on the surface flows in through the pores, a degree of hydrophilicity of the surface of the nanofiber web may be preferably evaluated by the initial wetting angle. Meanwhile, as time passes after a droplet is formed, a small or no change in the wetting angle means that pores of the surface of the nanofiber web are blocked due to the hydrophilic modification. Through this, it may be known that the initially designed pore structure of the nanofiber web is changed by the hydrophilic modification.

Also, since a degree of hydrophilicity is uniform for each location of the exposed surface of the nanofiber webs 111 and 112 included in one embodiment of the present invention, an average deviation of initial wetting angles with respect to five points where average initial wetting angles are measured may be equal to or smaller than 7°, preferably, 5°, and more particularly, 3°. When the average deviation of the initial wetting angles exceeds 7°, a point having a low average initial wetting angle, but a low degree of hydrophilicity for each location of the nanofiber web may be present such that occurrence of a differential pressure may increase in the place where a degree of hydrophilicity is low and a desirable degree of flow rate may not be obtained. Here, the average deviation of the initial wetting angles means an average of absolute values with respect to deviations of initial wetting angles of five points with respect to an average initial wetting angle that is an arithmetic mean of initial wetting angles of the five points.

$$\text{Average Deviation (°)} = \left( \sum_{i=1}^{5} |\text{average initial wetting angle (°)} - \text{initial wetting angle (°) at a point } Xi| \right) / 5 \quad \text{[Equation 1]}$$

Here, the point Xi means any one of different 5 points (X1 to X5) where initial wetting angles are measured.

The above-described filter medium 1000 may be manufactured using the following method, but is not limited thereto.

The filter medium 1000 according to the present invention may be manufactured through operations including (1) laminating a nanofiber web with a second support and (2) disposing and laminating the nanofiber web and the second support, which are laminated, on each of both sides of a first support such that the second support comes into contact with the first support.

First, as the operation (1) according to the present invention, an operation of laminating the nanofiber web with the second support is performed.

Since the nanofiber web includes nanofiber, any method of forming a fiber web having a three-dimensional network shape may be used without limitation. Preferably, the nanofiber web may be formed by electrospinning a spinning solution including a fluorine-based compound on the second support.

The spinning solution may include, for example, a fluorine-based compound and a solvent, as a fiber-forming component. 5 to 30 wt %, and preferably, 8 to 20 wt % of the fluorine-based compound may be included in the spinning solution. When the fluorine-based compound is less than 5 wt %, it is difficult to form a fiber. When being spun, the fluorine-based compound is not spun in a fiber shape and is sprayed in a droplet state to form a film shape. Alternatively, even when spinning is performed, a lot of beads are formed and the solvent is not volatilized well such that a phenomenon in which pores are blocked may occur during a calendering process which will be described. Also, when the fluorine-based compound exceeds 30 wt %, viscosity increases and solidification occurs on a surface of the solution such that it is difficult to perform spinning for a long time, and a diameter of fibers increases such that it is not possible to form a fiber shape having a size on the order of submicrometer.

As the solvent, any solvent, which does not generate a precipitation while dissolving the fluorine-based compound which is a fiber-forming component and does not influence spinning properties of nanofibers, which will be described below, may be used without limitation. Preferably, any one or more selected from the group consisting of r-butyrolactone, cyclohexanone, 3-hexanone, 3-heptanone, 3-octanone, N-methylpyrrolidone, dimethylacetamide, acetone, dimethyl sulfoxide, and dimethylformamide may be included. As an example, the solvent may be a mixed solvent of dimethylacetamide and acetone.

A nanofiber may be manufactured using the manufactured spinning solution through any one of well-known electrospinning devices and methods. As an example, as the electrospinning device, an electrospinning device including a single spinning pack including one spinning nozzle may be used or an electrospinning device including a plurality of single spinning packs or a spinning pack including a plurality of nozzles may be used for mass production. Also, as an electrospinning method, dry-spinning or wet-spinning including an external coagulation tub may be used without limitation.

When an agitated spinning solution is injected into the electrospinning device and electrospun on a collector, for example, paper, a nanofiber web formed of a nanofiber may be obtained. As an example of a specific condition for the electrospinning, for example, an air pressure of air sprayed by an air spray nozzle provided in a nozzle of the spinning pack may be set within a range of 0.01 to 0.2 MPa. When the air pressure is less than 0.01 MPa, there is no effect on collection and accumulation. When 0.2 MPa is exceeded, a phenomenon, in which a cone of a spinning nozzle is solidified such that a needle is blocked, occurs such that trouble may occur in spinning. Also, when the spinning solution is spun, an injection speed of the spinning solution per nozzle may be 10 to 30 µl/min. Also, a distance between a tip of the nozzle and the collector may be 10 to 30 cm. However, the distance is not limited thereto and may be modified according to purpose.

Also, the nanofiber web may be formed directly on the second support by electrospinning the nanofiber directly on the above-described second support. The nanofiber accumulated/collected on the second support has a three-dimensional network structure and may be implemented as the nanofiber web having a three-dimensional network structure by further applying heat and/or pressure to the accumulated/collected nanofiber to retain porosity, a pore diameter, and a basis weight, which are adequate for realizing desirable water permeability and filtration efficiency of a separation membrane. A detailed method of applying heat and/or pressure may be selected from well-known methods. As a non-limiting example, a general calendering process may be used in which a temperature of applied heat may be 70 to 190° C. Also, when the calendering process is performed, the process may be divided into several cycles and performed a plurality of times. For example, a drying process for removing a part or an entirety of a solvent and water remaining on the nanofiber may be performed through primary calendering and then secondary calendering may be performed to adjust pores and to improve strength. Here, degree(s) of heat and/or pressure, which are/is applied in the calendering processes, may be equal or different.

When the second support is implemented using a low melting point composite fiber, bonding between the nanofiber web and the second support through heat fusion may be performed at the same time through the calendering process. Also, an additional hot-melt powder or hot-melt web may be further interposed to bond the second support to the nanofiber web. Here, a temperature of applied heat may be 60 to 190° C. and an applied pressure may be 0.1 to 10 kgf/cm², but they are not limited thereto. However, components such as the hot-melt powder, which is separately added for bonding, generate fumes or are melted in a process of laminating supports or laminating a support with nanofiber and block pores frequently such that it is not possible to achieve a flow rate of the initially designed filter medium. Also, since the components are soluble in a water treatment process such that environmentally adverse problems may be caused, preferably, the second support and the nanofiber web may be bonded to each other without the components.

Next, before the operation (2) which will be described below, an operation of forming a hydrophilic coating layer by treating the nanofiber web with a hydrophilic coating layer-forming composition may be performed.

In detail, the operation may be performed including treating the nanofiber web with the hydrophilic coating layer-forming composition and forming the hydrophilic coating layer by thermally treating the hydrophilic coating layer-forming composition.

First, the hydrophilic coating layer-forming composition may include a hydrophilic component and a crosslinking component, and for example, may include PVA, a crosslinking agent including a carboxyl group, and a solvent dissolving the same, for example, water. The hydrophilic coating layer-forming composition may include 2 to 20 parts by weight of the crosslinking agent and 1,000 to 100,000 parts by weight of the solvent with respect to 100 parts by weight of PVA.

Meanwhile, when the nanofiber forming the manufactured nanofiber web includes a fluorine-based compound, due to strong hydrophobicity, a coating layer may not be properly formed on the surface even when being treated using the above-described hydrophilic coating layer-forming composition. Accordingly, the hydrophilic coating layer-forming composition may further include a wettability enhancer to well saturate the outer surface of the nanofiber with the hydrophilic coating layer-forming composition.

As the wettability enhancer, any one of components capable of improving the wettability of the outer surface of the hydrophobic nanofiber with respect to a hydrophilic solution and being soluble in the hydrophilic coating layer-forming composition may be used without limitation. As an example, the wettability enhancer may be one or more components selected from the group consisting of isopropyl alcohol, ethyl alcohol, and methyl alcohol. Also, the wettability enhancer may be included at 1,000 to 100,000 parts by weight with respect to 100 parts by weight of PVA included in the hydrophilic coating layer-forming composition. When the wettability enhancer is included at less than 1000 parts by weight, wettability of the nanofiber is improved insignificantly such that the hydrophilic coating layer may not be easily formed and the hydrophilic coating layer may be frequently delaminated. Also, when the wettability enhancer is included at more than 100,000 parts by weight, the wettability may be insignificantly improved and concentrations of PVA and the crosslinking agent included in the hydrophilic coating layer-forming composition are decreased such that the hydrophilic coating layer may not be easily formed.

Meanwhile, the hydrophilic coating layer may be formed by pretreating the nanofiber web with the wettability enhancer and then treating the nanofiber web with the hydrophilic coating layer-forming composition while the hydrophilic coating layer-forming composition does not include the wettability enhancer. However, when the nanofiber web is immersed into the hydrophilic coating layer-forming composition while the wettability enhancer is held in the pores, the wettability enhancer held in the pores discharges from the nanofiber web, and at the same time, the time required for the hydrophilic coating layer-forming composition to permeate into the pores increases such that manufacturing time increases. Also, since a degree of permeation of the hydrophilic coating layer-forming composition varies according to a thickness of the nanofiber web and a diameter of the pores, the hydrophilic coating layer may be non-uniformly formed according to the position of the fiber web. In addition, as the hydrophilic coating layer is non-uniformly formed, some pores at a part of the nanofiber web are blocked by the hydrophilic coating layer. In this case, since an initially designed pore structure of the nanofiber web changes, a desirable flow rate may not be obtained. Accordingly, the hydrophilic coating layer-forming composition, which includes the wettability enhancer, is beneficial for reducing a manufacturing time, simplifying a manufacturing process, and improving the formability of the hydrophilic coating layer at the same time without a change in a pore structure of the nanofiber web.

As a method of forming the above-described hydrophilic coating layer-forming composition on the nanofiber web, any one of well-known coating methods may be employed without limitation. For example, immersion, spraying methods, and the like may be used.

Afterwards, an operation of forming the hydrophilic coating layer by thermally treating the hydrophilic coating layer-forming composition on the nanofiber web may be performed. Through the thermal treatment, a process of drying the solvent in the hydrophilic coating layer-forming composition may be performed at the same time. The thermal treatment may be performed by a dryer. Here, a temperature of applied heat may be 80 to 160° C. and a treatment time may be 1 to 60 minutes, but they are not limited thereto.

Next, as the operation (2) according to the present invention, an operation of disposing and laminating the nanofiber web and the second support, which are laminated, on each of both sides of the first support such that the second support, which is laminated with the nanofiber web, comes into contact with the first support is performed.

The operation (2) may be performed through operations including (2-1) disposing the second support and the nanofiber web which are laminated in the operation (1), on each of both sides of the first support such that the second support contacts the first support, and (2-2) fusing the first support and the second support by applying any one or more of heat and pressure.

In the operation (2-2), a detailed method of applying heat and/or pressure may be selected from well-known methods. As a non-limiting example, a general calendering process may be used in which a temperature of applied heat may be 70 to 190° C. Also, when the calendering process is performed, the process may be divided into several cycles and performed a plurality of times. For example, secondary calendering may be performed after primary calendering. Here, degree(s) of heat and/or pressure, which are/is applied in the calendering processes, may be equal or different. Bonding between the second support and the first support through heat fusion may be performed through the operation (2-2) such that an additional adhesive or adhesive layer may be omitted.

The present invention provides a filter unit including the filter medium manufactured using the above-described manufacturing method.

Figure 7A:
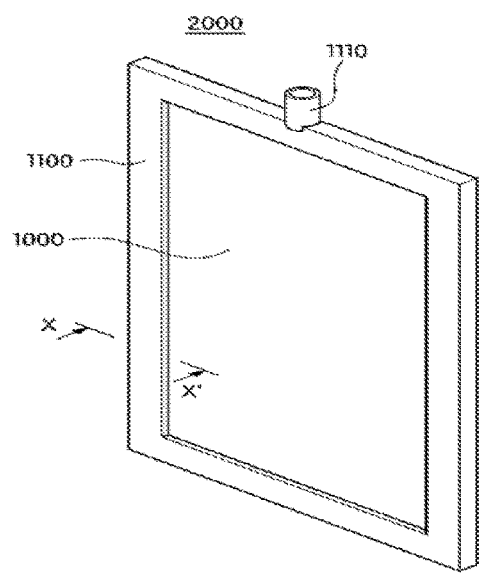
FIG. 7A is a perspective view of the filter unit.

As shown in FIG. 7A, the filter medium 1000 may be implemented as a flat filter unit 2000. In detail, the flat filter unit 2000 includes the filter medium 1000 and a support frame 1100 which supports an edge of the filter medium 1000. An inlet port 1110 capable of forming a pressure difference (gradient) between the outside and inside the filter medium 1000 may be included in any one area of the support frame 1100. Also, a flow path through which the filtrate filtered by the nanofiber webs passes through a support 200 of the filter medium 1000, in which the second support and the first support are laminated, and is discharged to the outside may be formed in the support frame 1100.

Figure 7B:
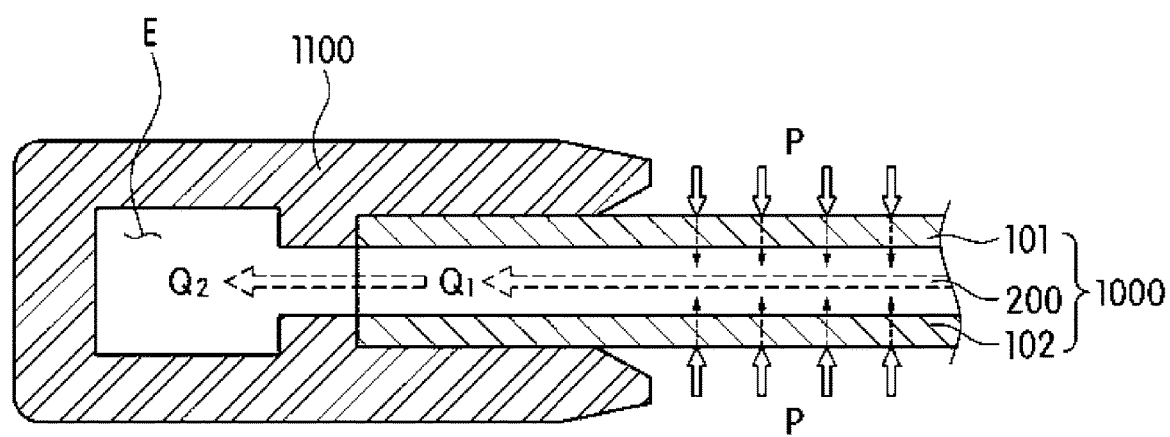
FIG. 7B is a schematic diagram illustrating a filtration flow on the basis of a cross-sectional view taken along a line X-X' of FIG. 7A.

In detail, in the filter unit 2000 as shown in FIG. 7A, when a suction force at high pressure is applied through the inlet port 1110, a liquid P to be treated, which is disposed outside the filter medium 1000, may move toward the inside of the filter medium 1000 as shown in FIG. 7B, a filtrate Q1 filtered through nanofiber webs 101 and 102, may flow along the flow path formed through the support 200, in which the second support and the first support are laminated, and may flow into a flow path E provided in a support frame 1100, and a suctioned filtrate Q2 may be discharged to the outside through the inlet port 1110.

Also, the flat filter unit 2000 as shown in FIG. 7A may be implemented in a filter module in which a plurality of such flat filter units are spaced at certain intervals apart in one external case. Also, a plurality of such filter modules may be laminated/blocked to form a large water treatment apparatus.

MODES OF THE INVENTION

Although the following examples of the present invention will be described in more detail, the following examples do not limit the scope of the present invention and should be construed as aiding the understanding of the present invention.

Example 1

First, to prepare a spinning solution, a mixed solvent was manufactured by dissolving 12 g of polyvinylidene fluoride (Arkema Co., Ltd, Kynar761), as a fiber-forming component, using a magnetic bar, in 88 g of a mixed solvent, in which dimethylacetamide and acetone were mixed at a weight ratio of 70:30, at a temperature of 80° C. for six hours. The spinning solution was injected into a solution tank of an electrospinning device and was discharged at a speed of 15 μl/min/hole. Here, in a spinning section, a temperature of 30° C. and a humidity of 50%, were maintained and a distance between a collector and a spinning nozzle tip was 20 cm. A laminate including a nanofiber web formed of PVDF nanofibers having an average diameter of 250 nm on one surface of a second support was manufactured by disposing a non-woven fabric (NamYang Nonwoven Fabric Co., Ltd, CCP40) having an average thickness of about 200 μm and a basis weight of 40 g/m² and formed of a second low melting point composite fiber having an average diameter of 20 μm and including a sheath portion formed of polyethylene having a melting point of about 120° C. and a core portion of polypropylene, as the second support, on the collector and then applying a voltage of 40 kV to a spinning nozzle pack using a high voltage generator while simultaneously applying an air pressure of 0.03 MPa per spinning pack nozzle. The manufactured nanofiber web was formed of nanofibers having an average diameter of 250 nm and including a first nanofiber group having a diameter of 0.1 to 0.2 μm, a second nanofiber group having a diameter of 0.2 to 0.3 μm, and a third nanofiber group having a diameter of 0.3 to 0.4 μm at 35 wt %, 53 wt %, and 12 wt %, respectively, and had a basis weight of 10 g/m², a thickness of 13 μm, an average pore diameter of 0.3 μm, and a porosity of about 75%.

Figure 5B:
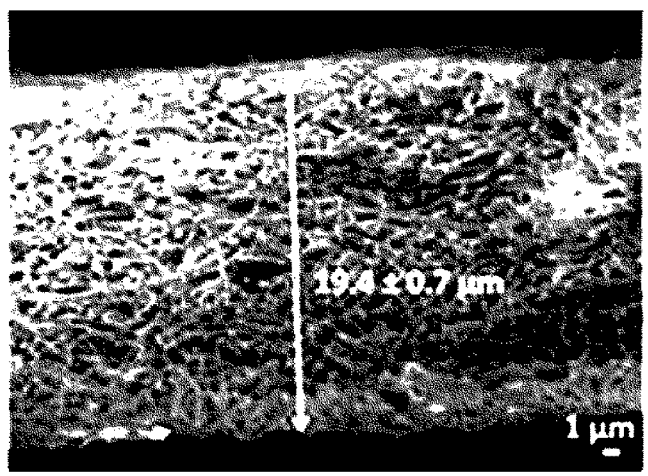
Figure 6:
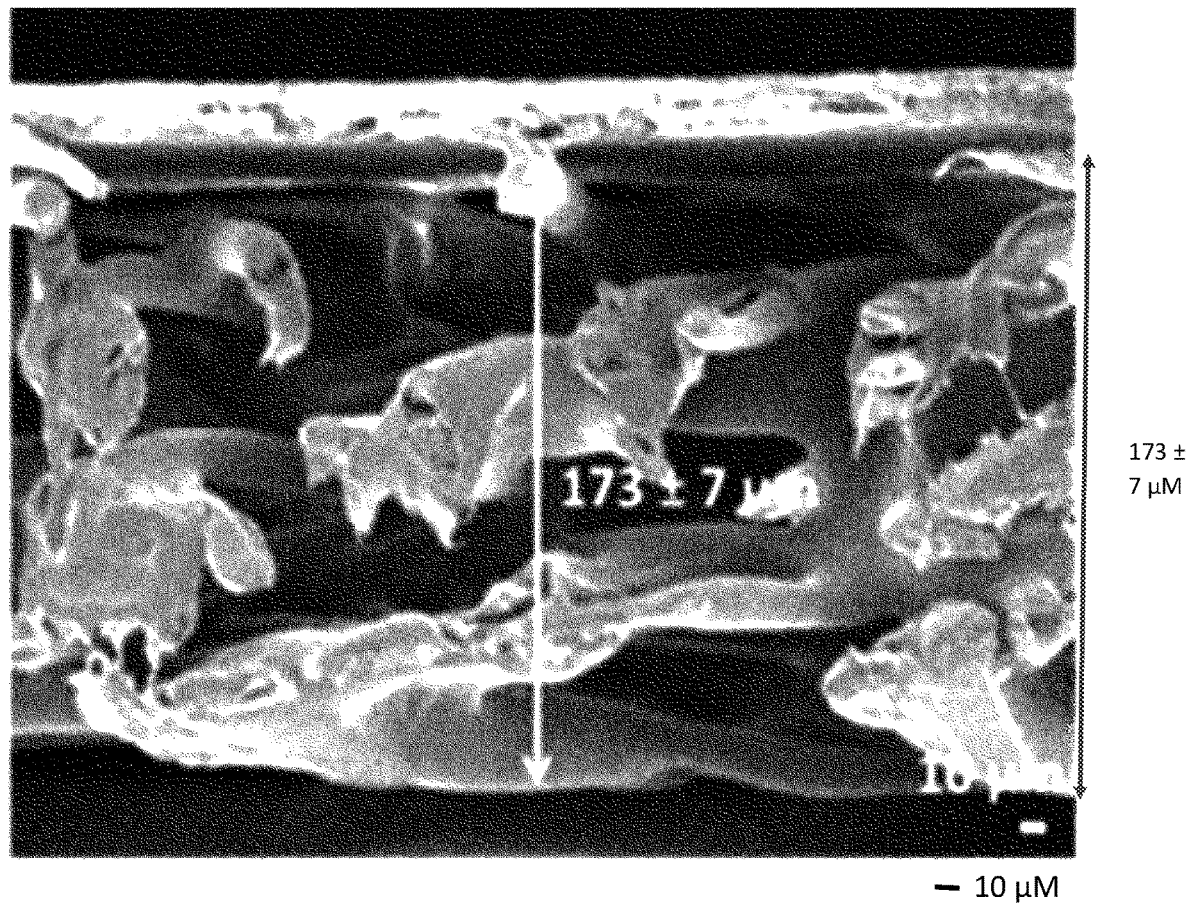
FIG. 6 is an electron microscope photo of a cross section of the filter medium included in one embodiment of the present invention.

Next, to dry a solvent and water remaining on the nanofiber web of the lamination and to thermally fuse the second support with the nanofiber web, a calendering process was performed by applying heat at a temperature equal to or higher than 140° C. and a pressure of 1 kgf/cm². In the manufactured laminate, the second support and the nanofiber web were thermally fused and bonded as shown in FIG. 6. The nanofiber web was configured to have a three-dimensional network structure as shown in FIGS. 5A and 5B.

Afterwards, a hydrophilic coating layer was provided on a surface of the nanofibers of the nanofiber web by immersing the manufactured laminate into a hydrophilic coating layer-forming composition prepared in the following Preparation Example and then drying the immersed laminate in a dryer at a temperature of 110° C. for five minutes.

Afterwards, the laminate was disposed to allow the second support of the manufactured laminate to face each side of a first support. Here, as the first support, a non-woven fabric (NamYang Nonwoven Fabric Co., Ltd, NP450) having a thickness of 5 mm and a melting point of about 120° C. and formed of the second low melting point composite fiber having a diameter of about 30 μm and including a sheath portion of polyethylene and a core portion of polypropylene was used. Afterwards, a filter medium as shown in Table 1 was manufactured by applying heat at a temperature of 140° C. and a pressure of 1 kgf/cm².

Preparation Example

A mixed solution was prepared by mixing 7142 parts by weight of deionized water with 100 parts by weight of PVA (Kuraray Co., Ltd, PVA217) as a hydrophilic component, and then dissolving the PVA using a magnetic bar at a temperature of 80° C. for six hours. A temperature of the mixed solution was decreased to room temperature, and then 15 parts by weight of poly(acrylic acid-maleic acid) (Aldrich, PAM) was mixed, as a crosslinking agent, with the mixed solution with respect to 100 parts by weight of the PVA and dissolved at room temperature for twelve hours. Afterwards, a hydrophilic coating layer-forming composition was prepared by adding and mixing 7142 parts by weight of isopropyl alcohol (Duksan Scientific Corp, IPA) with the mixture solution with respect to 100 parts by weight of PVA for two hours.

Examples 2 to 12

Filter media shown in following Tables 1 and 2 were manufactured in the same manner as in Example 1 except that a thickness/basis weight of a first support, a thickness/basis weight of a second support, and a basis weight of a nanofiber web were changed as shown in Tables 1 and 2.

Here, in the case of Example 12, a filter medium was implemented using supports having specifications similar to those of the first support and the second support of Example 1 while a first support and a second support were formed of composite fiber in which a sheath portion was a low melting point polyether copolymer having a melting point of 142° C. and a core portion is polyethylene terephthalate (PET)) and a lamination temperature was changed to 160° C.

Comparative Examples 1 to 4

Filter media as shown in following Table 2 were manufactured in the same manner as in Example 1 except that a thickness of a first support and a basis weight of nanofiber web were changed as shown in Table 2.

Here, in Comparative Example 3, a filter medium was manufactured as shown in Table 2 without a second support.

Experimental Examples

Each of filter media manufactured according to the Examples and Comparative Examples was implemented as a filter unit as shown in FIG. 7A, and following properties were evaluated and shown in Tables 1 and 2.

1. Measurement of Initial Water Permeability

Water permeability and filtration efficiency were measured per 0.5 m² of an area of a specimen by applying an operational pressure of 50 kPa to the filter unit. Here, as initial water permeability, water permeability of each of filter media according to the other Examples and Comparative Examples was calculated a relative percentage on the basis of water permeability of the filter medium of Example 1, which is 100.

2. Evaluation of Durability in Backwashing

A filter unit was immersed into water and backwashing was performed by applying an operational pressure of 50 kPa thereto such that water (400 LMH) was pressurized for two minutes per 0.5 m² of an area of a specimen. Afterwards, durability in backwashing was evaluated by assigning O when an exterior abnormality such as swelling and the like occurred during a backwashing process, and assigning X when the abnormality did not occur.

At this time, backwashing was performed with an increased operational pressure of 125 kPa, which exceeds general backwashing conditions greatly, only on a filter unit without an exterior abnormality during operation under an operating condition of 50 kPa, and then an exterior abnormality was evaluated in the same manner.

Also, only when an exterior abnormality did not occur while backwashing was performed with the operational pressure of 125 kPa, water permeability after backwashing was measured for the corresponding filter unit in the same manner as an initial water permeability measuring method.

Here, water permeability was calculated with a variation rate between initial water permeability A and water permeability B after backwashing of each specimen according to following Equation 1. As the variation rate increases, it can be seen that damage to a nanofiber web and a support or delamination between layers according to backwashing, which is not shown as an exterior abnormality, occur.

$$\text{Variation rate}(\%) = \{(B-A) \times 100\} \pm A$$

TABLE 1

|  |  | Example 1 | Example 2 | Example 3 | Example 4 | Example 5 | Example 6 | Example 7 | Example 8 |
|---|---|---|---|---|---|---|---|---|---|
| Nanofiber web | Basis weight (g/m²) | 10 | 20 | 29 | 25 | 10 | 10 | 10 | 10 |
| | Thickness (μm) | 15 | 25 | 40 | 40 | 15 | 15 | 15 | 15 |
| Second support | Basis weight (g/m²) | 40 | 40 | 40 | 40 | 59 | 62 | 40 | 40 |
| | Thickness (μm) | 200 | 200 | 200 | 200 | 250 | 250 | 200 | 200 |
| First support | Basis weight (g/m²) | 450 | 450 | 450 | 450 | 450 | 450 | 330 | 650 |
| | Thickness (μm) | 5000 | 5000 | 5000 | 5000 | 5000 | 5000 | 5000 | 5000 |
| Overall thickness of filter medium (μm) | | 5215 | 5225 | 5240 | 5240 | 5265 | 5265 | 5215 | 5215 |
| Proportion of thickness of first support in overall thickness of filter medium (%) | | 95.9 | 95.7 | 95.4 | 95.0 | 95.0 | 95.9 | 95.9 | 95.9 |

TABLE 1-continued

|  | Example 1 | Example 2 | Example 3 | Example 4 | Example 5 | Example 6 | Example 7 | Example 8 |
|---|---|---|---|---|---|---|---|---|
| Magnification of basis weight of second support on basis of basis weight of nanofiber web | 4 | 2 | 1.38 | 1.60 | 5.9 | 6.2 | 4 | 4 |
| Magnification of basis weight of first support on basis of basis weight of second support | 11.25 | 11.25 | 11.25 | 10.23 | 7.63 | 7.26 | 8.25 | 16.25 |
| Initial water permeability (%) | 100 | 92 | 82 | 88 | 96 | 91 | 100 | 86 |
| Durability in backwashing — Whether abnormality is present (@50 kPa) | X | X | X | X | X | X | X | X |
| Whether abnormality is present (@125 kPa) | X | X | X | X | X | X | X | X |
| Variation rate of water permeability (%) | 6.8 | 8.1 | 21.5 | 13.6 | 13.1 | 28.9 | 12.2 | 7.6 |

TABLE 2

|  |  | Example 9 | Example 10 | Example 11 | Example 12 | Comparative Example 1 | Comparative Example 2 | Comparative Example 3 | Comparative Example 4 |
|---|---|---|---|---|---|---|---|---|---|
| Nanofiber web | Basis weight (g/m$^2$) | 10 | 10 | 10 | 10 | 10 | 10 | 10 | 32 |
|  | Thickness (μm) | 15 | 15 | 15 | 15 | 15 | 15 | 15 | 40 |
| Second support | Basis weight (g/m$^2$) | 40 | 40 | 40 | 41 | 40 | 40 | 0 | 40 |
|  | Thickness (μm) | 200 | 200 | 200 | 200 | 230 | 230 | 0 | 200 |
| First support | Basis weight (g/m$^2$) | 680 | 450 | 270 | 430 | 270 | 230 | 270 | 450 |
|  | Thickness (μm) | 5000 | 3400 | 2200 | 5000 | 2000 | 2500 | 2200 | 5000 |
| Overall thickness of filter medium (μm) |  | 5215 | 3615 | 2415 | 5215 | 2245 | 2745 | 2215 | 5240 |
| Proportion of thickness of first support in overall thickness of filter medium (%) |  | 95.9 | 94.1 | 91.1 | 95.9 | 89.2 | 91.1 | 99.4 | 95.4 |
| Magnification of basis weight of second support on basis of basis weight of nanofiber web |  | 4 | 4 | 4 | 4.1 | 4 | 4 | 0 | 1.25 |
| Magnification of basis weight of first support on basis of basis weight of second support |  | 17 | 11.25 | 6.75 | 10.49 | 6.75 | 5.75 | — | 11.25 |
| Initial water permeability (%) |  | 84 | 87 | 80 | 100 | 79 | 87 | 94 | 76 |
| Durability in backwashing | Whether abnormality is present (@50 kPa) | X | X | X | X | X | ○ | ○ | X |
|  | Whether abnormality is present (@125 kPa) | X | X | X | X | ○ | unperformed | unperformed | ○ |
|  | Variation rate of water permeability (%) | 12.1 | 13.6 | 14.0 | 14.6 | unmeasured | unmeasured | unmeasured | unmeasured |

As seen in Tables 1 and 2, when backwashing was performed with a pressure of 50 kPa on a filter medium of Comparative Example 4, in which a basis weight of a nanofiber web exceeds 30 g/m$^2$, there was no exterior abnormality. However, when a backwashing pressure is 125 kPa, the nanofiber web is partially delaminated and a swelling phenomenon occurs as shown in FIG. 2. On the other hand, in the case of Examples 1 to 3 in which a basis weight of a nanofiber web is equal to or smaller than 30 g/m$^2$, it can be seen that an abnormality does not occur when backwashing is performed with a pressure of 125 kPa.

Also, in the case of Comparative Example 1 in which a thickness of a first support is less than 90% of an overall thickness of a filter medium, there was no exterior abnormality caused by backwashing when backwashing was performed with a pressure of 50 kPa, but it occurred when the pressure increases to 125 kPa. On the other hand, in the case of Example 11 in which a thickness of a first support is equal to or greater than 90% of an overall thickness of a filter medium under the same conditions, it can be seen that despite performing backwashing with a pressure of 125 kPa, an exterior abnormality did not occur.

Also, in the case of Comparative Example 2 in which a basis weight of a first support is less than 250 g/m$^2$, it can be seen that despite a thickness of the first support, which was equal to or greater than 90% of an overall thickness of a filter medium, an exterior abnormality occurred even at a backwashing pressure of 50 kPa and durability was significantly degraded by the backwashing compared to Comparative Example 1 due to a decrease in mechanical strength caused by backwashing.

Also, in the case of Comparative Example 3 excluding a second support, it can be seen that an exterior abnormality occurred even when backwashing was performed with a pressure of 50 kPa. This is judged to be a result of weakness in adhesion between a first support and a nanofiber web despite the inclusion of the first support capable of withstanding a pressure caused by backwashing like Example 11, without the second support.

On the other hand, in the case of Example 11 in which a basis weight of a first support is equal to or greater than 250 g/m², it can be seen that an exterior abnormality did not occur even under a severe operational pressure of 125 kPa.

Meanwhile, among the Examples, in the case of Examples 3 and 6, in which a basis weight of a second support is not included within a range of 1.5 to 6 times on the basis of a nanofiber web, it can be seen that a variation rate of water permeability is significantly high in comparison to Examples 4 and 5 which are within the range.

Also, in Examples 6 and 9 in which a basis weight of a first support is not included within a range of 8 to 16.5 times on the basis of a second support, it can be seen that in the case of Example 6, a variation rate of water permeability is significantly larger in comparison to Example 7, and in the case of Example 9, a variation rate of water permeability increases and initial water permeability is significantly degraded in comparison to Example 8.

Also, even in a case in which a thickness of a first support is equal to or greater than 90% of an overall thickness of a filter medium, it can be seen that damage caused by backwashing is significantly lower in Example 1, in which a thickness of a first support is equal to or greater than 95% of an overall thickness of a filter medium, compared to Example 10.

Also, in the case of Example 12 in which a first support and a second support are formed of a low melting point composite fiber of polyester instead of a polyolefin, when a backwashing pressure was 125 kPa, durability was degraded after backwashing because adhesion was degraded due to brittleness of the supports in comparison to Example 1 using a polyolefin.

Although one embodiment of the present invention has been described above, the concept of the present invention is not limited to the embodiment disclosed herein. Other embodiments may be easily perceived by one of ordinary skill in the art by adding, changing, deleting, adding, and the like a component within an equivalent range of the concept and should be included in the scope of the present invention.

The invention claimed is:

1. A filter medium for water treatment comprising a second support and a nanofiber web sequentially laminated on each of both sides of a first support and having a flow path through which a filtrate filtered by the nanofiber web flows toward the first support,
    wherein the first support is a non-woven fabric comprising a first composite fiber which comprises a support component and a low melting point component and is disposed to expose at least a part of the low melting point component at an outer surface thereof, and the second support is a non-woven fabric comprising a second composite fiber which comprises a support component and a low melting point component and is disposed to expose at least a part of the melting point component at an outer surface thereof,
    wherein the support component and the low melting point component of each of the first composite fiber and the second composite fiber are polyolefin polymer compounds,
    wherein the first support and the second support are bonded through fusion between the low melting point component of the first composite fiber and the low melting point component of the second composite fiber, and the low melting point component of the second composite fiber is fused with the nanofiber web,
    wherein the nanofiber web comprises a poly(vinylidene fluoride) (PVDF) as a fiber-forming component and has a basis weight equal to or smaller than 30 g/m²,
    wherein the second support has a function of increasing adhesion between the first support and the nanofiber web, and has a basis weight of 35 to 100 g/m² and a thickness of 150 to 250 μm, and the second composite fiber of the second support has an average diameter of 10 to 25 μm,
    wherein the first support has a basis weight of 250 to 650 g/m² and a thickness of 2 to 8 mm,
    the thickness of the first support is equal to or greater than 90% of an overall thickness of the filter medium, and the first composite fiber of the first support has an average diameter of 20 to 50 μm,
    wherein the basis weight of the second support is 1.5 to 6 times a basis weight of the nanofiber web, and
    wherein the basis weight of the first support is 8 to 16.5 times the basis weight of the second support.

2. The filter medium for water treatment of claim 1, wherein the nanofiber web has an average pore diameter of 0.1 to 3 μm and a porosity of 60 to 90%.

3. A method of manufacturing a filter medium for water treatment, comprising:
    (1) laminating a nanofiber web with a second support, which has a function of increasing adhesion between a first support and the nanofiber web, by applying heat and/or pressure; and
    (2) disposing and laminating, by applying heat and pressure, the nanofiber web and the second support, which are laminated, on each of both sides of the first support such that the second support comes into contact with the first support,
    wherein the first support is a non-woven fabric comprising a first composite fiber which comprises a support component and a low melting point component and is disposed to expose at least a part of the low melting point component at an outer surface thereof, and the second support is a non-woven fabric comprising a second composite fiber which comprises a support component and a low melting point component and is disposed to expose at least a part of the melting point component at an outer surface thereof,
    wherein the support component and the low melting point component of each of the first composite fiber and the second composite fiber are polyolefin polymer compounds,
    wherein the nanofiber web comprises a poly(vinylidene fluoride) (PVDF) as a fiber-forming component and has a basis weight equal to or smaller than 30 g/m²,
    wherein the second support has a basis weight of 35 to 100 g/m², and a thickness of 150 to 250 μm, and the second composite fiber of the second support has an average diameter of 10 to 25 μm, wherein the first support has a basis weight of 250 to 650 g/m² and a thickness of 2 to 8 mm,
    the thickness of the first support is equal to or greater than 90% of an overall thickness of the filter medium, and the first composite fiber of the first support has an average diameter of 20 to 50 μm,
    wherein the basis weight of the second support is 1.5 to 6 times a basis weight of the nanofiber web, and
    wherein the basis weight of the first support is 8 to 16.5 times the basis weight of the second support.

4. The method of claim 3, wherein the operation (1) comprises:
- (1-1) forming the nanofiber web by electrospinning a nanofiber on the second support; and
- (1-2) laminating the nanofiber web with the second support by applying heat and pressure to both sides of the second support on which the nanofiber web is formed.

5. A flat filter unit for water treatment comprising:
the filter medium according to claim 1; and
a support frame comprising a flow path, through which a filtrate filtered by the filter medium is discharged to the outside, and supporting an edge of the filter medium.

6. A filter module for water treatment comprising a plurality of the flat filter units according to claim 5, which are spaced a certain interval apart.

* * * * *